Aug. 6, 1946.  W. HUBER  2,405,146
TURBO-MACHINE
Filed Sept. 3, 1943
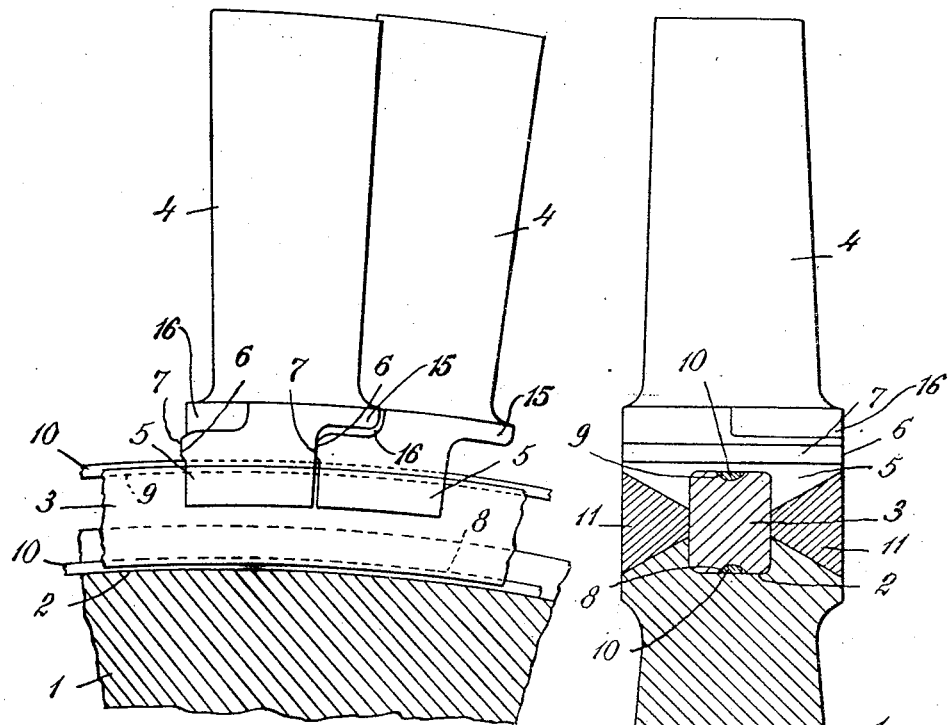
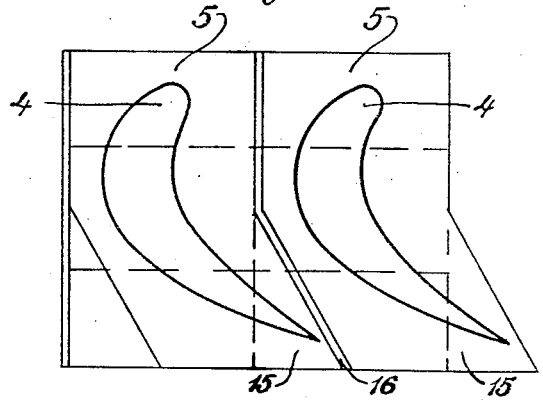
INVENTOR
Walter Huber
BY
Pennie, Davis, Marvin & Edmonds
ATTORNEYS Patented Aug. 6, 1946

2,405,146

UNITED STATES PATENT OFFICE 2,405,146

TURBOMACHINE

Walter Huber, Winterthur, Switzerland, assignor to Sulzer Freres, Société Anonyme, Winterthur, Switzerland Application September 3, 1943, Serial No. 501,072
In Switzerland December 24, 1942

5 Claims. (Cl. 253—77)

The invention relates to a turbo-machine with blades welded on to the rotor. The invention is characterised in that adjacent blades are supported against one another in a tangential direction by means of yielding spacers.

The blades may, for example, be supported against one another by means of plastically deformable spacers, in which case these distance pieces may be manufactured in one piece with the blade root. The blades may also be supported against one another by means of plastically deformable bars. Finally, it is also possible for elastically yielding elements to be attached to the blades or to be inserted between them.

The subject matter of the invention is explained in more detail below with the aid of the drawing.

Fig. 1 shows a cross-section,

Fig. 2 shows in part a side elevation and in part a section of a part of the rotor of a turbo-machine according to the invention.

Fig. 3 is a view from above of the subject matter shown in Figs. 1 and 2.

The rotor disk 1 is provided with an annular groove 2, in which is laid a ring 3 consisting of several parts. The fork-shaped blade roots 5 of the blades 4 are set astraddle over the ring.

The blade roots 5 have spacers 6, which are left in the form of ledges running transverse to the blade by the partial milling away of the lateral surfaces of the roots during the manufacture of the blades. Adjacent blades are in contact before welding only at a very small surface 7 of the spacers 6. Each blade root 5 has a triangular projection 15 and a triangular recess 16. The projection 15 of one blade root fits into the corresponding recess 16 of the adjacent root.

In ring 3 two grooves 8 and 9 are provided, in each of which a bar 10 is laid. Before welding the bars 10 have such a cross-sectional shape that the cylindrical surfaces of ring 3 lie neither against the bottom of groove 2 nor against the bottom surface of the fork of the blade roots 5 (illustration in Fig. 2).

When cooling sets in after weld 11 has been made, blades 4 with their roots 5 are drawn radially towards the centre of the rotor disk 1 on account of the contraction of the weld material. In this way bars 10 are plastically deformed in grooves 8 and 9, so that ring 3 comes to lie with its cylindrical surfaces against the bottom of groove 2 and against the bottom surfaces of the fork in the blade roots (Fig. 1). Thus the distance between the blades is also reduced. Bars 10 have relatively small cross-sectional areas and are plastically deformable under the excessive strains due to the contraction of welds 11.

The surface pressure now arising on surfaces 7 of the distance pieces 6 is such that the spacers 6 are plastically deformed. As comparatively small forces are required for the plastic deformation of the bars 10 and spacers 6, no considerable stresses such as might endanger the rotor when in service arise during the contraction of weld 11.

Gaps still remaining open between the blade roots can be closed by caulking.

I claim:

1. A turbomachine having blades welded on the rotor which comprises a ring around the rotor and spaced inward from the side edges thereof, a plurality of blades mounted over the ring, a relatively small bar which may be plastically deformed, in a space between the rotor and ring and another of said bars in a space between the ring and the blades, said bars holding the blades spaced from the ring and the ring spaced from the rotor when the rotor parts are assembled prior to welding, and means for welding the blades to the rotor on both sides of the ring, the cooling and contracting of the weld causing the bars to be deformed and the blades to lie against the ring and the ring to lie against the rotor.

2. A turbomachine according to claim 1 which comprises a relatively narrow spacer on a face of the root of each blade which is in bearing contact with the next blade, said spacer being yieldable in the tangential direction of the rotor due to the contraction following welding.

3. A turbomachine which comprises a rotor with an annular exterior groove, a ring in the groove, rotor blades each having a groove in the root thereof permitting the blades to straddle the ring, a plastically deformable spacer between the ring and the rotor and between the ring and the blades, said spacers holding the blades spaced from the ring and the ring spaced from the rotor when the rotor parts are assembled prior to welding, and means for welding the blades to the rotor on each side of the ring, said spacers being relatively narrow and plastically deformable due to the contraction of the welds, whereby the blades lie against the ring and the ring lies against the rotor after the welds have been completed and cooled.

4. A turbomachine which comprises a rotor, a plurality of blades for the rotor, means for welding the blades to the rotor, a relatively narrow spacer on a face of the root of each blade which is in bearing contact with the next blade, said spacer being yieldable in the tangential direction of the rotor due to the contraction following welding, and means circumferentially disposed around the rotor and between the rotor and the blades which supports the blades spaced from the rotor prior to welding and which yields under the contraction resulting from welding causing the blades to bear against the rotor.

5. A turbomachine having a rotor which comprises blades fastened to the rotor by a weld, a deformable spacer on a face of the root of each blade outside of the weld, said spacer being in bearing contact with the root of the next blade and being yieldable in the tangential direction of the rotor due to the contraction of the weld following welding.

WALTER HUBER.